United States Patent Office 3,083,188
Patented Mar. 26, 1963

3,083,188
DETERGENT CONDENSATION POLYMERS
Frank A. Stuart, Orinda, William T. Stewart, El Cerrito, Warren Lowe, San Francisco, and Frank W. Kavanagh, Berkeley, Calif., assignors to California Research Corporation, San Francisco, Calif., a corporation of Delaware
No Drawing. Filed June 22, 1959, Ser. No. 821,683
6 Claims. (Cl. 260—78)

This invention relates to novel detergent condensation polymers. More particularly, the invention is concerned with important new polyglycol substituted linear polyamides useful as detergents and dispersants in mineral lubricating oils and hydrocarbon fuels and also as surface-active agents for other general applications.

The compounds of this invention are polyglycol substituted linear polyamides of (A) dibasic acids selected from the group consisting of aliphatic, cycloaliphatic and aromatic dicarboxylic acids in which the carboxyl groups are separated by a hydrocarbon chain of not more than 20 carbon atoms and corresponding acids in which the hydrocarbon chain has at least one aliphatic hydrocarbon group attached thereto and (B) polyamines selected from the group consisting of primary and secondary aliphatic diamines in which the two terminal primary and secondary amine groups are separated by an aliphatic chain of not more than 10 carbon atoms, said polyamides containing from about 40 to about 96% by weight of hydrocarbon oil-solubilizing groups and from about 4 to about 60% by weight of polyglycol groups, said oil-solubilizing groups being selected from the class consisting of aliphatic and cycloaliphatic hydrocarbon groups of at least 4 carbon atoms each, said polyglycol groups being selected from the class consisting of monoalkyl ethers and monoesters of polyalkylene glycols in which the alkyl ether contains from 1 to 18 carbon atoms and the acid of the monoester group is an aliphatic monocarboxylic acid of 2 to 20 carbon atoms, said polyalkylene glycols having at least 5 alkylene oxide units each, from 2 to 7 carbon atoms in each alkylene group and a molecular weight between about 220 and 30,000, said polyamides having a total molecular weight of at least 5,000 as measured by the light scattering method and a solubility in oil of at least 0.5% by weight.

The polyglycol substituted condensation polymers of the invention are characterized by recurring units of the following structural formula:

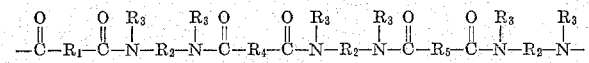

wherein $R_1$ is an aliphatic, cycloaliphatic or aromatic group having a hydrocarbon chain of not more than 20 carbon atoms between the two carbonyl groups, $R_2$ is an aliphatic chain of not more than 10 carbon atoms which may include tertiary amine groups in which the tertiary amine nitrogen within the chain is attached to an alkyl group, $R_3$ is preferably alkyl of not more than 20 carbon atoms, but may be hydrogen or polyalkylene glycol as described above and $R_4$ and $R_5$ are, respectively, polyglycol substituted and aliphatic hydrocarbon group substituted hydrocarbon groups corresponding to $R_1$. Units of the aforementioned character occur repeatedly in various arrangements at random throughout the polyglycol substituted condensation polymers of the invention.

As indicated above, the dibasic acids of the polyglycol substituted linear polyamides according to this invention are characterized by a hydrocarbon chain of not more than 20 carbon atoms between the two carboxyl groups, portions of the acids having the hydrocarbon chain attached to aliphatic hydrocarbon groups and polyalkylene glycol groups of the type previously described. Representative dibasic acids include oxalic acid, malonic acid, glutaric acid, adipic acid, sebacic acid, azelaic acid, phthalic acid, isophthalic acid, terephthalic acid, succinic acid, dilinoleic acid, dioleic acid, hydrogenated dilinoleic acid, alkyl, alkenyl and alkoxy succinic and malonic acids in which the alkyl and alkenyl groups have 8 to 300 carbon atoms, as in the case of polyisobutenyl succinic acid, and similar acids having a variety of polyalkylene glycol groups attached thereto, said polyalkylene glycol groups being of the type described above.

Representative polyamines for the polyglycol substituted linear polyamides of the invention include ethylene diamine, 1,3-propylene diamine, 1,6-diaminohexane, N,N'-dioctyl-1,6-diaminohexane, phenylene diamine, 1,2-butane diamine and linear polyamines having tertiary amino groups within the chain as in the case of tetraethylene pentaamine having methyl groups attached to the three amino nitrogens within the chain. For present purposes, the preferred amines are $\alpha,\omega$-aliphatic secondary amines such as N,N'-dimethyl propylene diamine-1,3, since it is possible for the extra hydrogen of the primary amine to react further following the formation of the linear polyamide. Such further reaction may result in undesirable cross linking which reduces solubility and causes formation of jells.

The polyglycol group of the compounds of the invention preferably contains at least 5 alkylene oxide units with alkylene groups of from 2 to 7 carbon atoms each as previously mentioned. Up to about 690 or, preferably, 230 of these alkylene oxide units may be present in the polyglycol group. The end of the polyglycol group other than that linked to the polyamide is alkyl ether or ester.

The polyalkylene glycols of the polyglycol polymeric compounds of the invention have the above-described essential characteristics. Poly-1,2-alkylene glycols and their alkyl ethers having molecular weights between about 220 and 30,000 are preferred. Such polyglycols may be obtained by polymerizing 1,2-alkylene oxides or mixtures thereof in the presence of a catalyst and a suitable initiator for the reaction such as water or monohydride aliphatic alcohol in the case of the alkyl ethers. The preparation of polyglycol compounds of this type has been fully described heretofore in the U.S. Patents 2,448,664 and 2,457,139, for example, and therefore requires no detailed discussion here.

For present purposes, the most suitable poly-1,2-alkylene glycol groups are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 and 10,000. These polyalkylene glycol groups provide monomers useful in the preparation of outstanding detergent copolymers.

The following polyalkylene glycol groups containing from 2 to 7 carbon atoms in each alkylene group are illustrative of the types described above.

—(CH$_2$—CH$_2$—O)$_5$—OC$_2$H$_5$
—(CH$_2$—CH$_2$—O)$_7$—CH$_2$CH$_2$N(C$_2$H$_5$)$_2$

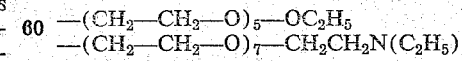

—[CH(CH$_3$)CH$_2$—O]$_5$—C$_6$H$_5$
—[CH(CH$_3$)CH$_2$—O]$_7$—SC$_{12}$H$_{25}$
—[CH$_2$—CH$_2$—O—CH(CH$_3$)CH$_2$—O]$_5$C$_{12}$H$_{25}$
—(CH$_2$CH$_2$—O)$_9$CH$_3$
—(CH$_2$—CH$_2$—O)$_{13}$—C$_8$H$_{17}$
—(CH$_2$—CH$_2$—O)$_{13}$—C$_{12}$H$_{25}$
—(CH$_2$—CH$_2$—O)$_{13}$—C$_{18}$H$_{37}$
—[CH$_2$CH(CH$_3$)O]$_{30}$C$_3$H$_7$

—$(CH_2—CH_2—CH_2O)_{40}C_5H_{11}$
—$(C_5H_{10}O)_5C_{12}H_{25}$

Monoalkyl ethers of polyethylene glycol mixtures having average molecular weights of 220, 400, 1000, 1540, 2000 or 10,000.

Monoalkyl ethers of poly-1,2-propylene glycol mixtures having average molecular weights of 425, 1025 or 10,000.

The polyalkylene glycol groups as illustrated above are ordinarily attached to the linear polyamide chain by an ether oxygen group. Other suitable attaching groups for the polyalkylene glycols include sulfide and the amino groups.

The polyglycol groups may be incorporated in the polyamides according to several different methods. In one of the two preferred routes the polyglycol group is substituted on a portion of the monomers before condensation. The second alternative route is based on substituting or "growing" the polyglycol off of a reactive center in the polyamide subsequent to the condensation. In either method, suitable monomers and polymers must possess reactive centers to which preformed polyalkylene glycol may be attached or from which polymerization of alkylene oxide may be initiated.

Representative dibasic acids of the above type include those containing one or more amino, hydroxyl or sulfhydryl groups. Such acids are tartronic acid, malic acid, tartaric acid, $\alpha,\beta$-gamma-trihydroxy glutaric acid, mucic acid, mesoxalic acid, citramalic acid, glutamic acid, aminomalonic acid, aspartic acid. In employing these acids for the addition of the polyalkylene glycols or alkylene oxide polymerization, the acid carboxyl groups must first be blocked to prevent them from entering into the reaction. Conversion to the alkyl diester such as the dimethyl or diethyl ester accomplishes this and permits the addition of the polyalkylene glycol chain to the free hydroxyl, amino or sulfhydryl group. Subsequent saponification of the ester blocking groups yields the free polyglycol substituted dibasic acid for use in the polyamide condensation polymers of this invention.

In a similar fashion, the polyamines may be employed to attach the polyglycol chain prior to the condensation reaction which forms the polyamide linear polymers. Hydroxy, sulfhydryl or amino substituted diamines such as 1-hydroxy-1,3-propylene diamine or N,N'-dimethyl-2-hydroxy-1,6-hexylene diamine are illustrative of this type of amine. As in the case of the dibasic acid for this purpose, the amino group must be blocked before addition of the polyalkylene glycol and then liberated. Conversion of the terminal amino groups to readily removable groups such as the formamide is preferred for this purpose.

As mentioned above, the alternative preferred route for incorporating polyalklyene glycol in the polyamide condensation polymers of the invention involves addition of the polyglycol to the preformed condensation polymer. This is not conveniently done through the amino, hydroxyl and sulfhydryl groups employed above in the case of the monomers, since such groups tend to enter into the condensation reaction and form undesirable cross-linkages. However, mono-substituted amido groups may be employed satisfactorily for this purpose. To do this, a diamine containing two primary amino groups such as ethylene diamine is included in the desired amount in the reaction to provide sufficient amido groups having a removable hydrogen for the addition of the polyalkylene glycol. The condensation polyamide thus obtained is then reacted with alkylene oxide which is initiated off of the resulting mono-substituted amido groups to give the desired polyalkylene glycol chain.

In preparing the polyglycol-substituted polyamides of this invention, it is important to obtain a final product which is oil-soluble, that is one that is soluble in the petroleum or other lubricating oil employed to the extent of at least 0.5% and preferably 2% or more by weight. Since the various aliphatic hydrocarbon groups differ somewhat in their oil-solubilizing characteristics, preliminary tests are sometimes desirable to determine whether the relative proportion of aliphatic hydrocarbon is high enough to impart the desired degree of oil-solubility. If the solubility in oil of the polymers is unduly low, the proportion of aliphatic hydrocarbon groups is easily increased to bring the final oil-solubility to the desired level.

In general, satisfactory oil-solubility, detergent and over-all surface active properties are obtained with polymers wherein the aliphatic and cycloaliphatic hydrocarbon oil-solubilizing groups constitute from about 40 to about 96% by weight of the total polymer composition, and the polyglycol groups constitute from about 4 to about 60% by weight.

The polyglycol substituted polyamides of the invention are readily prepared according to the general principles of the reactions outlined above. Possible variations in the nature of the reactants and in the selection of suitable reaction paths would obviously suggest themselves to those skilled in the art.

The compounds of the invention have apparent molecular weights as determined by standard light scattering methods of at least 5,000. For practical purposes, molecular weights of from about 5,000 to about 100,000 are most suitable from the standpoint of viscosity and other physical characteristics of the polymeric additives.

Typical methods for preparing the polyglycol substituted linear polyamides according to the invention are given in the following examples. Unless otherwise specified, the proportions are on a weight basis.

*Example I*

This example illustrates the preparation of the polyethylene glycol ether of dimethyl tartronate intermediate.

0.5 mole (60 grams) of the dimethyl ester of tartronic acid and 3 grams of sodium methylate are charged to a rocker type pressure reaction vessel and heated to 115° C. 450 grams (10 moles) of ethylene oxide are fed to the vessel at a pressure of about 40 pounds per square inch gauge until all of the ethylene oxide is reacted, as indicated by pressure change. The reaction vessel is then cooled and the product consisting of the polyethylene ether of dimethyl tartronate containing approximately 20 ethylene oxide units per molecule on the average is withdrawn. The product is hydrolyzed with a small excess of aqueous caustic by refluxing the mixture for several hours. The mixture is then neutralized with hydrochloric acid. Methanol and water are removed from the reaction mixture by vacuum distillation. After the product has been allowed to stand, the precipitated sodium chloride is removed by filtration.

The free terminal OH group on the polyethylene glycol of the above product is next converted to the monobutyl ether. This is desirable to limit any tendency toward cross-linking of the final polyamide product. One mole of the polyethylene ether of tartronic acid is reacted with 3 moles of metallic sodium in toluene to give the disodium salt sodium alcoholate. This sodium salt-alcoholate is reacted with a large excess of butyl chloride in a pressure vessel to give the monobutyl ether, dibutyl ester derivative. The dibutyl ester groups are hydrolyzed off in the same manner as outlined above in the case of the dimethyl ester. Sodium chloride and butanol are removed by vacuum distillation. The final product is the butoxyeicosaethylene ether of tartronic acid.

*Example II*

This example illustrates the preparation of polyglycol substituted polyamide employing the above intermediate.

0.111 mole (118.5 grams) of the butoxyeicosaethylene glycol ether of tartronic acid prepared above, 0.930 mole (526.5 grams) of hydrogenated dilinoleic acid and 1.04 moles (355 grams) of N,N'-di-2-ethylhexyl-1,6-diaminohexane are charged to a reaction vessel fitted with stirrer, condenser and means for removing water of condensation.

The reaction mixture is heated at 200° C. and the water formed is removed. 150 neutral mineral lubricating oil is fed in as the product thickens to maintain fluidity of the reaction mixture. When the reaction is substantially complete as indicated by slow evolution of water, heating is discontinued and sufficient oil is added to provide a 40% concentrate of the polyamide in oil.

The concentrate obtained above is diluted with three volumes of a light hydrocarbon naphtha solvent and filtered to remove unreacted materials. The solvent is removed from the concentrate by distillation. The polymer in the concentrate contains 10% by weight of the polyethylene glycol and the polymer has an approximate molecular weight of about 10,000.

Additional examples of the polyglycol substituted polyamides of the invention are given below. In these examples, the polyglycol substituted polyamide condensation polymers are prepared by the procedures outlined in the preceding examples.

*Example III*

In this example, the di-(butoxypolyethylene glycol)-diether of tartaric acid is employed in place of the tartronic acid of the above examples. The final polyglycol substituted polyamide has a molecular weight of approximately 23,000 and a polyglycol content of about 5% by weight.

*Example IV*

In this example the preparation of a polyglycol substituted polyamide is similar to the above example except that polyisobutenyl succinic acid in which the polyisobutenyl chain contains 75 carbon atoms is used in place of the dilinoleic acid of Example II. The molecular weight of the final product is approximately 17,000 and the polyalkylene glycol content is about 22% by weight.

*Example V*

In this example the preparation of the polyamide is similar to that prepared in Example II, except that the amine employed is N,N'-didodecyl decylenediamine. The molecular weight of the product is approximately 26,000 and the polyethylene glycol content is 30% by weight.

*Example VI*

Here the preparation of a polyamide is carried as in Example IV, but N,N'N''-trioctyldiethylenetriamine is used in place of N,N'-di-ethylhexyl-1,6-diaminohexane of Example IV.

*Example VII*

A linear polyglycol substituted polyamide in accordance with the product of Example IV is prepared in this example employing N,N',N'',N''',N''''-pentadecyl tetraethylene pentaamine as the amine.

*Example VIII*

In this example, a polymer similar to that of Example II is prepared using a polypropylene glycol substituted tartronic acid having approximately 20 polyglycol units. The products have a molecular weight of about 20,000 and a polyglycol content of approximately 40% by weight.

*Example IX*

In this example, the polyglycol chain is incorporated in the backbone of a polyamide similar to the above example.

Polyethylene glycol having an average molecular weight of about 2,000 is converted to the alpha, omega-chloride by reaction with thionyl chloride. The dichloride thus obtained is then reacted with a large excess of octylamine to give the diamine having the formula:

$$\text{H-N-(CH}_2\text{CH}_2\text{O)}_{45}\text{CH}_2\text{CH}_2\text{-NH}$$
$$\quad\;\; |\qquad\qquad\qquad\qquad\qquad |$$
$$\;\; \text{C}_8\text{H}_{17}\qquad\qquad\qquad\qquad \text{C}_8\text{H}_{17}$$

The polyglycol diamine obtained above is condensed with alkenyl succinic acid where the alkenyl group is polyisobutenyl containing 150 carbon atoms, and with N,N'-dioctyl-1,6-hexanediamine in suitable ratio to give a polyglycol substituted polyamide having a molecular weight of approximately 8000 and 17% by weight of polyethylene glycol.

Also in accordance with the above examples, polyglycol substituted polymers obtained by the polymerization of unsaturated vinyl-type monomers may be used in the preparation of polyamide condensation polymers. For example, polyglycol substituted vinyl polymers such as the eicosaethylene glycol methacrylate, dodecyl methacrylate, and methacrylic acid copolymer may be reacted with a suitable diamine such as N,N'-di-2-ethylhexyl-1,6-hexane diamine to form the corresponding polyamide.

All of the above products have utility as dispersants. They also increase the viscosity and viscosity index of lubricating oils in which they are employed. They may be used with other conventional additives in fuels, automatic transmission fluids and lubricants in general.

Other variations in the types of polyalkylene glycol groups and monomers within the scope of this invention will be apparent to one skilled in the art from the above illustrative examples.

This application is a continuation-in-part of copending application Serial No. 729,560 of Frank A. Stuart, William T. Stewart, Warren Lowe and Frank W. Kavanagh, filed April 21, 1958, now Patent No. 2,892,783.

We claim:

1. Polyglycol substituted linear polyamides of (A) a polyethylene glycol ether of dibasic acid selected from the group consisting of tartronic acid, malic acid, tartaric acid, $\alpha,\beta,\gamma$-trihydroxy glutaric acid, mucic acid, mesoxalic acid and citramalic acid, (B) a dibasic acid selected from the group consisting of oxalic acid, malonic acid, plutaric acid, adipic acid, sebacic acid, azelai acid, phthalic acid, isophthalic acid, terephthalic acid, succinic acid, dilinoleic acid, dioleic acid, hydrogenated dilinoleic acid, alkyl, alkenyl and alkoxy succinic and malonic acids in which the alkyl and alkenyl groups have 8 to 300 carbon atoms, and (C) a polyamine selected from the group consisting of ethylene diamine, 1,3-propylene diamine, 1,6-diaminohexane, N,N'-dioctyl-1,6-diaminohexane, phenylene diamine and 1,2-butane diamine, said polyamides containing from about 40 to about 96% by weight of aliphatic hydrocarbon oil-solubilizing groups and from about 4 to about 60% by weight of polyglycol groups, said polyethylene glycol having a molecular weight between about 220 and 30,000, said polyamides having a total molecular weight of at least 5,000 as measured by the light scattering method and a solubility in oil of at least 0.5% by weight.

2. Compound of claim 1, in which the (A) component is the di-(butoxypolyethylene glycol)-di-ether of tartaric acid, the (B) component is fully saturated hydrogeneated dilinoleic acid and the (C) component is N,N-di-2-ethylhexyl-1,6-diaminohexane.

3. Compound of claim 1, in which the (A) component is the butoxyeicosaethylene glycol ether of tartronic acid and the (B) component is polyisobutenyl succinic acid in which the polyisobutenyl chain contains 75 carbon atoms.

4. Compound of claim 1, in which the (A) component is the butoxyeicosaethylene glycol ether of tartronic acid, the (B) component is fully saturated hydrogenated dilinoleic acid and the (C) component is N,N'-didodecyl decylenediamine.

5. Compound of claim 1, in which the (A) component is the butoxyeicosaethylene glycol ether of tartronic acid, the (B) component is fully saturated hydrogenated dilinoleic acid and the (C) component is N,N'N''-trioctyl-diethylenetriamine.

6. Compound of claim 1, in which the (A) component is the butoxyeicosaethylene glycol ether of tartronic acid, the (B) component is fully saturated hydrogenated dilinoleic acid and the (C) component is N,N′-di-2-ethylhexyl-1,6-diaminohexane.

References Cited in the file of this patent

UNITED STATES PATENTS

| | | | |
|---|---|---|---|
| 2,191,556 | Carothers | Feb. 27, 1940 |
| 2,574,544 | De Groote | Nov. 13, 1951 |
| 2,835,653 | Hass et al. | May 20, 1958 |
| 2,836,579 | Schweitzer | May 27, 1958 |
| 2,875,059 | Unrut et al. | Feb. 24, 1959 |
| 2,880,196 | Frank et al. | Mar. 31, 1959 |
| 2,893,974 | Greenlee | July 7, 1959 |